(12) United States Patent
Kronrod

(10) Patent No.: US 8,769,289 B1
(45) Date of Patent: Jul. 1, 2014

(54) AUTHENTICATION OF A USER ACCESSING A PROTECTED RESOURCE USING MULTI-CHANNEL PROTOCOL

(75) Inventor: Boris Kronrod, Netanya (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/617,159

(22) Filed: Sep. 14, 2012

(51) Int. Cl.
*H04L 9/32* (2006.01)
*H04L 29/06* (2006.01)
*G06F 21/00* (2013.01)
*G06F 7/04* (2006.01)
*H04L 9/00* (2006.01)
*H04L 9/08* (2006.01)

(52) U.S. Cl.
USPC ........... 713/171; 713/161; 713/168; 713/176; 713/180; 713/181; 713/184; 726/4; 726/5; 726/26; 380/43; 380/285

(58) Field of Classification Search
USPC ......... 713/176, 161, 168, 171, 180, 181, 184; 726/4, 5, 26; 380/43, 285
See application file for complete search history.

(56) References Cited

U.S. PATENT DOCUMENTS

2013/0159195 A1* 6/2013 Kirillin et al. .................. 705/71

* cited by examiner

*Primary Examiner* — Aravind Moorthy
(74) *Attorney, Agent, or Firm* — Ryan, Mason & Lewis, LLP

(57) ABSTRACT

A user accessing a protected resource is authenticated using multiple channels, including a mobile device of the user. A user attempting to access a protected resource is authenticated by receiving a request from a mobile device of the user to access the protected resource; receiving a public key from the mobile device of the user; providing a provision token to the mobile device, wherein the provision token is used by the user to access the protected resource using a second device; and confirming the provision token to a provider of the protected resource to authorize the user to access the protected resource. The user then communicates with the provider using a second device to authorize the provisioning token. A transaction signing protocol is also provided.

18 Claims, 3 Drawing Sheets

```
T1 - END USER INITIALIZES A PROVISIONING PROCESS WITH WAAS
T2 - MOBILE DEVICE CREATES A PAIR OF PRIVATE AND PUBLIC KEYS
T3 - MOBILE DEVICE SENDS PUBLIC KEY TO BE STORED AT WAAS
T4 - MOBILE DEVICE RECEIVES PROVISION TOKEN FROM WAAS
T5 - USER CONTACTS WSP TO AUTHORIZE PROVISIONING TOKEN
T6 - WSP CONFIRMS PROVISIONING TOKEN WITH WAAS
```

FIG. 3B

T1 – USER STARTS A WEB TRANSACTION
T2 – WSP REQUESTS A USER's DEVICE PUBLIC KEY FROM WAAS
T3 – WSP ENCODES TRANSACTION DETAILS WITH WSP's PRIVATE KEY AND USER's PUBLIC KEY
T4 – WSP SENDS ENCODED TRANSACTION DETAILS TO WAAS
T5 – USER REQUESTS TRANSACTION DETAILS FROM WAAS
T6 – MOBILE DEVICE DECODES THE TRANSACTION DATA WITH PUBLIC KEY OF WSP AND PRIVATE KEY OF USER MOBILE DEVICE
T7 – USER ENTERS PIN AND SIGNS CONCATENATION OF TRANSACTION DATA AND PIN AND SENDS IT TO WAAS
T8 – USER REQUESTS CONFIRMATION AND CAUSES WSP TO REQUEST CONFIRMATION FROM WAAS

FIG. 4

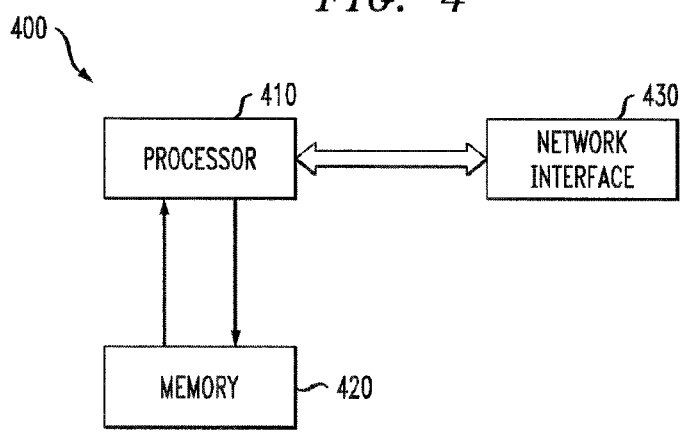

AUTHENTICATION OF A USER ACCESSING A PROTECTED RESOURCE USING MULTI-CHANNEL PROTOCOL

FIELD OF THE INVENTION

The present invention relates generally to techniques for controlling access to protected resources.

BACKGROUND OF THE INVENTION

Service providers receive login attempts from users wishing to gain access to applications, sensitive information and other resources. To gain access, users are generally required to authenticate themselves by presenting credentials, such as passwords, token codes, and/or personal identification numbers (PINs). An authentication server typically receives such authentication requests from users and either grants or denies access, based on whether the presented credentials match expected values. For added security, multiple authentication factors must often be entered and verified before access can be granted.

Multi-factor authentication requires the presentation of two or more of three authentication factors: something a user knows (such as a password), something the user has (such as a security token or a mobile device) and/or something the user is (such as a biometric of the user). A common two-factor authentication scheme involves both a token code and a PIN. The token code, also known as a one-time password, or "OTP," is generated automatically, such as by a portable device that a user has in his or her possession. The PIN is a number, or possibly an alpha-numeric string, that the user has memorized. Both the token and the PIN have been registered previously in connection with the user at the authentication server. The user enters both the token code and the PIN in one or more fields of a network login screen on the user's computer. Access to the remote network is only granted to the user's computer if both the token code (something the user has) and the PIN (something the user knows) can be verified. An example of a portable token is SecurID®, which is available from RSA Security LLC, Bedford, Mass.

Recently, software has been introduced to perform the functions of tokens on smart mobile devices, such as smart phones, PDAs, and tablets. See, e.g., RSA SecurID, "Software Authenticators," (EMC Corporation). In one example, a user of a computer wishing to access a remote network enters his or her PIN into a field displayed on the user's mobile device. The mobile device sends the PIN to an authentication server. If the PIN matches an expected value, the authentication server sends back a signal to unlock the mobile device to allow the mobile device to display a token code. The user can then transfer the token code manually to the computer to enable the computer to gain access to the remote network.

Since the user now communicates over two channels, the mobile phone becomes a two-factor, two-channel authentication mechanism. A need remains for improved mobile authentication techniques that authenticate a user accessing a protected resource using multiple channels, including the mobile device of the user.

SUMMARY OF THE INVENTION

The present invention in the illustrative embodiments described herein provides authentication of a user accessing a protected resource using multiple channels, including a mobile device of the user. In accordance with an aspect of the invention, a user attempting to access a protected resource is authenticated by receiving a request from a mobile device of the user to access the protected resource; receiving a public key from the mobile device of the user; providing a provision token to the mobile device, wherein the provision token is used by the user to access the protected resource using a second device; and confirming the provision token to a provider of the protected resource to authorize the user to access the protected resource. The user then communicates with the provider using a second device to authorize the provisioning token.

According to a further aspect of the invention, the user performing a transaction with the protected resource is authenticated by receiving encoded transaction data from a provider of the protected resource, wherein the transaction data is encoded using a private key of the provider and a public key of the user; providing the encoded transaction data to a mobile device of the user, wherein the mobile device decodes the encoded transaction data using a public key of the provider and a private key of the user; receiving from a second device of the user a signed concatenation of the transaction data and a personal identification number of the user; and providing confirmation to one or more of the user and the provider that the signed concatenation is for the transaction data received from the provider and is signed by the user of the mobile device. The concatenation of the transaction data and the personal identification number of the user is signed using the private key of the user, and optionally further signed using the public key of the provider.

The authentication techniques of the illustrative embodiments overcome one or more of the problems associated with the conventional techniques described previously, and provide improved authentication using multiple channels, including a mobile device of the user. These and other features and advantages of the present invention will become more readily apparent from the accompanying drawings and the following detailed description.

BRIEF DESCRIPTION OF THE DRAWINGS

FIG. 3 illustrates an exemplary multi-channel transaction signing process incorporating features of the present invention; and FIG. 4 illustrates one possible implementation of a given computing device of the exemplary network environment of FIG. 1.

DETAILED DESCRIPTION

The present invention provides improved authentication of a user accessing a protected resource using multiple channels, including a mobile device of the user. According to one aspect of the invention, a user attempting to access a protected resource is provided with a provision token during a registration process via a mobile device of the user. The provision token is used by the user to access the protected resource using a second device, such as a personal computer. A provider of the protected resource is also provided with the provision token of the user.

Thereafter, during a transaction with the protected resource, the provider of the protected resource provides transaction data that is encoded using a private key of the provider and a public key of the user. The encoded transaction data is provided to the mobile device of the user, and the mobile device decodes the encoded transaction data using a public key of the provider and a private key of the user. The user then employs a second device, such as a personal computer, to provide a concatenation of the transaction data and a personal identification number (PIN) of the user signed by the user. The provider of the protected resource is then provided with confirmation that the user can access the protected resource.

Figure 1:
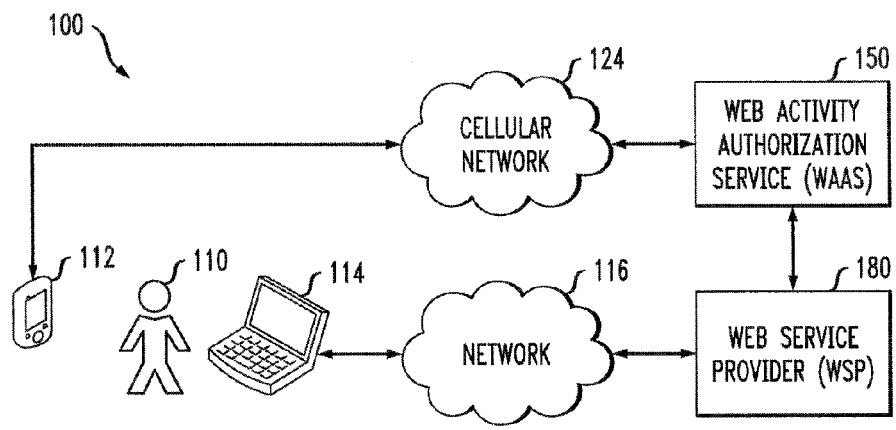
FIG. 1 shows an example environment in which enhanced authentication techniques employing multiple channels may be conducted.

FIG. 1 shows an exemplary environment 100 in which enhanced multi-channel authentication techniques may be conducted. The environment 100 includes a human user 110, a mobile device 112, and a computing device 114. The mobile device 112 is coupled to a cellular telephone network 124, and the computing device 114 is coupled to a network 116, such as the Internet. Also coupled to the network 116 and/or the cellular telephone network 124 are a web activity authorization service (WAAS) 150 and a web service provider (WSP) 180. The WAAS 150 and WSP 180 employ secure communications between each other, for example, in accordance with the IP protocol, over a wide area network (WAN) or a local area network (LAN).

The mobile device 112 is generally a smart phone, such as an iPhone, Blackberry, Droid, or a similar device; however, the mobile device 112 can be any smart device equipped with a network connection, which is capable of communicating over the network and running software.

The computing device 114 is the device employed by the user 110 to access resources on the remote network 122. The computing device 114 is therefore generally a computer, such as a desktop or laptop computer. This is not critical, however, and the computing device 114 can be any type of computing device, including a tablet computer or even a smart phone or another mobile device.

The WAAS 150 and WSP 180 are preferably separate servers. They may be included within the remote network 122 or provided outside the remote network 122. Although the WAAS 150 and WSP 180 may be combined on a single computer, they are preferably maintained on physically separate computers, or even on separate networks, for enhanced security.

Figure 2A:
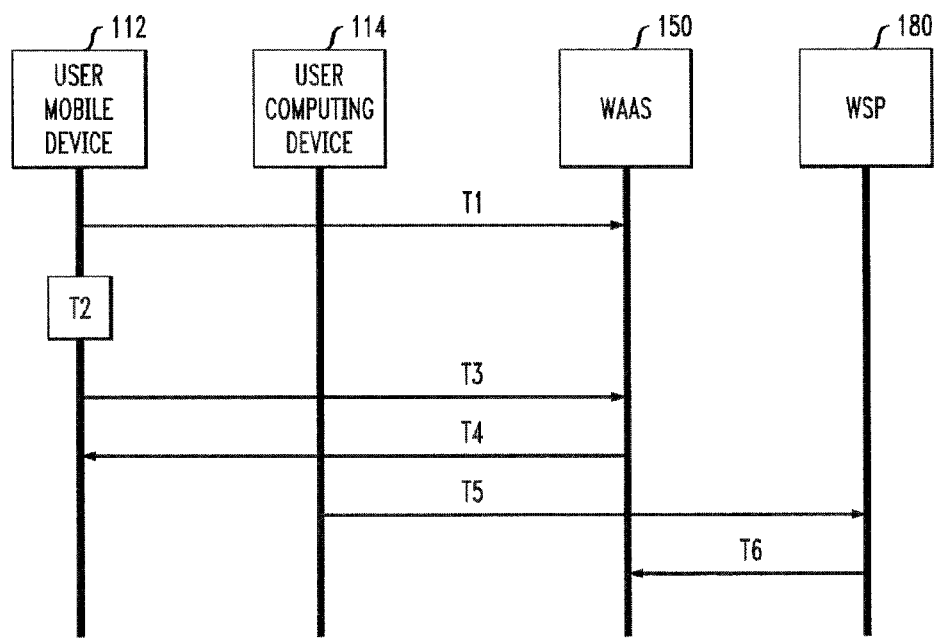
FIGS. 2A and 2B, collectively, illustrate an exemplary multi-channel registration process incorporating features of the present invention.
Figures 2B, 3A:
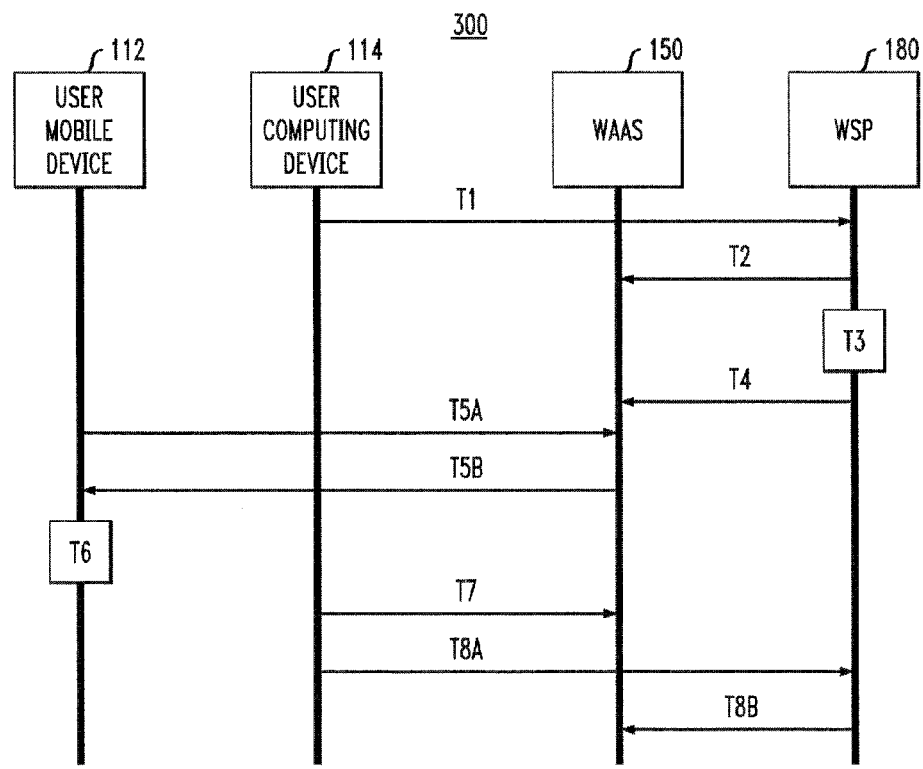

FIGS. 2A and 2B, collectively, illustrate an exemplary multi-channel registration process 200 incorporating features of the present invention. In particular, FIG. 2A illustrates communications among various system elements 112, 114, 150 and 180 of FIG. 1 at particular points in time, denoted T1 through T6, for an exemplary multi-channel registration process 200 incorporating features of the present invention. As shown in FIGS. 2A and 2B, at a time T1, the end user initializes a provisioning process with the WAAS 150. At a time T2, the mobile device 112 of the user creates a pair of private and public keys.

At a time T3, the mobile device 112 sends the public key to be stored at the WAAS 150 (with an organization identifier for the WSP 180, an account identifier, the user's PIN and the user's public key). At a time T4, the mobile device 112 receives a Provision token from the WAAS 150. At a time T5, the user contacts the WSP 180 with the second device 114 to authorize the provisioning token. The WSP 180 authenticates the user of the resource 170, for example, using out-of-band techniques, an SMS challenge, knowledge-based authentication and/or a face to face meeting. At a time T6, the WSP 180 confirms the provisioning token with the WAAS 150 (thus confirming connection between the WSP organization, account identifier and public key).

FIGS. 3A and 3B, collectively, illustrate an exemplary multi-channel transaction signing process 300 incorporating features of the present invention. In particular, FIG. 3A illustrates communications among various system elements 112, 114, 150 and 180 of FIG. 1 at particular points in time, denoted T1 through T8, for an exemplary multi-channel transaction signing process 300 incorporating features of the present invention. As shown in FIGS. 3A and 3B, at a time T1, the user starts a web transaction with the WSP 180, for example, from the user computer device 114. At a time T2, the WSP 180 requests the user's device public key.

At a time T3, the WSP 180 encodes the transaction details with the private key of the WSP 180 and the public key of the user. At a time T4, the WSP 180 sends the encoded transaction details to the WAAS 150.

At a time T5A, the user requests the transaction details from the WAAS 150 and at time T5B, the WAAS 150 provides the transaction details to the user mobile device 112. At a time T6, the mobile device 112 decodes the transaction (TX) data with the public key of the WSP 180 and the private key of the mobile device 112.

At a time T7, the user enters his or her personal identification number (PIN) and signs a concatenation of the transaction data and the PIN (e.g., using the private key of the user) and sends the signed concatenation to the WAAS 150. The signature is also signed by the public key of the WSP 180.

At a time T8A, the user requests confirmation from the WSP 180 using the second device 114 and causes the WSP 180 to request confirmation from the WAAS 150 at time T8B. The signed concatenation received by the WAAS 150 at time T7 is signed using the private key of the user. The WSP 180, however, does not have the user's private key. Thus, the WSP 180 requests the WAAS 150 to verify the information provided by the user. The WAAS 150 confirms that the received signed concatenation belongs to the transaction data provided by the WSP 180 at time T4 and also is signed by a person who holds a mobile device 112 with a valid private key and this person knows the shared secret PIN. The WAAS 150 does the verification by decrypting the signed concatenation message with the user's public key (which is kept only in WAAS 150) and checks that it is equal to a Hash Message Authentication Code (HMAC) of the transaction data encrypted by the WSP 180 plus the user PIN.

FIG. 4 shows one possible implementation of a given processing device 400 of the FIG. 1 system. The processing device 400 as shown may be viewed as representing, for example, WAAS 150 and/or WSP 180. The processing device 400 in this implementation includes a processor 410 coupled to a memory 420 and a network interface 430. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 420 and executed by the corresponding processor 410. The memory 420 is also used for storing information used to perform computations or other operations associated with the disclosed authentication on techniques.

For a more detailed discussion of suitable token-based authentication techniques, see, for example, U.S. Pat. No. 7,562,221 to Nyström et al., assigned to the assignee of the present invention and incorporated by reference herein. Additional details regarding certain conventional cryptographic techniques referred to herein may be found in, e.g., A. J. Menezes et al., Handbook of Applied Cryptography, CRC Press, 1997, which is incorporated by reference herein.

As mentioned previously herein, the above-described embodiments of the invention are presented by way of illustrative example only. Numerous variations and other alternative embodiments may be used. The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved multi-channel authentication access control techniques. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

Among other benefits, the WAAS 150 does not have access to the transaction details in the unencrypted mobile device 112. In addition, the WSP 180, such as a bank, encrypts the transaction details with the public key of the mobile device 112 so only the device 112 can open the transaction details. Advantageously, the WAAS 150 cannot be hacked, simply because the WAAS 150 does not store sensitive data. The WAAS 150 can be located, for example, in the cloud, because the WAAS 150 does not store or receive any sensitive data (other than the user PIN, which is only a third level of protection). Furthermore, the WAAS 150 and WSP 180 do not have access to the private key of the mobile device 112, so the user's private key cannot be stolen from the WAAS 150 or the WSP 180.

Further aspects of the invention ensure that the signing can be verified only by the WSP 180, since it is signed by the device's private key and encrypted by the bank's public key. A hacker would have to simultaneously attack the user's desktop 114 and mobile device 112 to fake the transaction signature from the client side. In addition, a hacker would have to simultaneously attack the WSP 180 and WAAS 150 to fake the transaction from the server side.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, and other types of access-controlled resources. Also, the particular configuration of system elements shown in FIG. 1, and their interactions as shown in FIGS. 2 and 3, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for authentication of a user attempting to access a protected resource, comprising:
   receiving a request from a mobile device of said user to access said protected resource;
   receiving a public key from said mobile device of said user;
   providing a provision token to said mobile device, wherein said provision token is used by said user to access said protected resource using a second device;
   confirming said provision token to a provider of said protected resource to authorize said user to access said protected resource;
   receiving encoded transaction data from a provider of said protected resource, wherein said transaction data is encoded using a private key of said provider and a public key of said user;
   providing said encoded transaction data to a mobile device of said user, wherein said mobile device decodes said encoded transaction data using a public key of said provider and a private key of said user;
   receiving from a second device of said user a signed concatenation of said transaction data and a personal identification number of said user; and
   providing confirmation to one or more of said user and said provider that said signed concatenation is for said transaction data received from said provider and is signed by said user of said mobile device.

2. The method of claim 1, wherein said concatenation of said transaction data and said personal identification number of said user is signed using said private key of said user.

3. The method of claim 1, wherein said user communicates with said provider using a second device to authorize said provisioning token.

4. The method of claim 1, further comprising the step of said provider authenticating said user.

5. A tangible machine-readable recordable storage medium for authentication of a user attempting to access a protected resource, wherein the one or more software programs when executed by one or more processing devices implement the steps of the method of claim 1.

6. A method for authentication of a user performing a transaction with a protected resource, comprising:
   receiving encoded transaction data from a provider of said protected resource, wherein said transaction data is encoded using a private key of said provider and a public key of said user;
   providing said encoded transaction data to a mobile device of said user, wherein said mobile device decodes said encoded transaction data using a public key of said provider and a private key of said user;
   receiving from a second device of said user a signed concatenation of said transaction data and a personal identification number of said user; and
   providing confirmation to one or more of said user and said provider that said signed concatenation is for said transaction data received from said provider and is signed by said user of said mobile device.

7. The method of claim 6, wherein said concatenation of said transaction data and said personal identification number of said user is signed using said private key of said user.

8. The method of claim 7, wherein said signed concatenation is further signed using said public key of said provider.

9. The method of claim 6, further comprising the step of receiving a public key from said mobile device of said user.

10. A tangible machine-readable recordable storage medium for authentication of a user performing a transaction with a protected resource, wherein the one or more software programs when executed by one or more processing devices implement the steps of the method of claim 6.

11. An apparatus for authentication of a user performing a transaction with a protected resource, comprising:
- a memory; and
- at least one hardware device, coupled to the memory, operative to implement the following steps:
    - receive a request from a mobile device of said user to access said protected resource;
    - receive a public key from said mobile device of said user;
    - provide a provision token to said mobile device, wherein said provision token is used by said user to access said protected resource using a second device;
    - confirm said provision token to a provider of said protected resource to authorize said user to access said protected resource;
    - receive encoded transaction data from a provider of said protected resource, wherein said transaction data is encoded using a private key of said provider and a public key of said user;
    - provide said encoded transaction data to a mobile device of said user, wherein said mobile device decodes said encoded transaction data using a public key of said provider and a private key of said user;
    - receive from a second device of said user a signed concatenation of said transaction data and a personal identification number of said user; and
    - provide confirmation to one or more of said user and said provider that said signed concatenation is for said transaction data received from said provider and is signed by said user of said mobile device.

12. The apparatus of claim 11, wherein said concatenation of said transaction data and said personal identification number of said user is signed using said private key of said user.

13. The apparatus of claim 11, wherein said user communicates with said provider using a second device to authorize said provisioning token.

14. The apparatus of claim 11, wherein said provider authenticates said user.

15. An apparatus for authentication of a user attempting to access a protected resource, comprising:
- a memory; and
- at least one hardware device, coupled to the memory, operative to implement the following steps:
    - receive encoded transaction data from a provider of said protected resource, wherein said transaction data is encoded using a private key of said provider and a public key of said user;
    - provide said encoded transaction data to a mobile device of said user, wherein said mobile device decodes said encoded transaction data using a public key of said provider and a private key of said user;
    - receive from a second device of said user a signed concatenation of said transaction data and a personal identification number of said user; and
    - provide confirmation to one or more of said user and said provider that said signed concatenation is for said transaction data received from said provider and is signed by said user of said mobile device.

16. The apparatus of claim 15, wherein said concatenation of said transaction data and said personal identification number of said user is signed using said private key of said user.

17. The apparatus of claim 16, wherein said signed concatenation is further signed using said public key of said provider.

18. The apparatus of claim 15, wherein said at least one hardware device is further configured to receive a public key from said mobile device of said user.

* * * * *